United States Patent Office 3,285,993
Patented Nov. 15, 1966

3,285,993
TERTIARY AMINO POLYAMIDES AS DYEABILITY IMPROVERS FOR POLYESTER RESINS
Yoshiaki Inamoto and Takeo Shima, Iwakuni-shi, Yamaguchi-ken, Japan, assignors to Teijin Limited, Osaka, Japan, a corporation of Japan
No Drawing. Filed Nov. 19, 1963, Ser. No. 324,855
Claims priority, application Japan, Nov. 26, 1962, 37/51,972
8 Claims. (Cl. 260—857)

This invention relates to a process for the production of modified polyesters.

More particularly, the invention relates to a process for modifying synthetic polyesters such as polyethylene terephthalate in order to impart improved dye affinity to the fibers and films prepared therefrom.

The fibers and textiles made from synthetic polyesters such as polyethylene terephthalate have hitherto been dyed mostly with dispersion dyes, because they have no affinity for ionic dyes. However, as is well known, dispersion dyes are expensive. Furthermore, in dyeing mixed-spun yarn composed of wool and polyester fibers with dispersion dyes, often the wool is soiled because of the difference in dye affinity of the two.

Thus, modified polyesters having affinity for ionic dyes, particularly inexpensive acid dyes, which can be dyed together with wool to the same coloration and deepness in a same dye bath have been in strong demand.

As an attempt to synthesize such polyesters having affinity for acid dyes, British Patent No. 734,416 proposes copolymerization of polyesters with aromatic or aliphatic tertiary amines. However, the copolyesters with aromatic amines so obtained still have insufficient affinity for acid dyes. Again, it is difficult to introduce sufficient amount of aliphatic amines into polyesters even by melt polymerization under very mild conditions, as the amines tend to decompose.

We made an extensive research for production method of modified polyesters having very high affinity for acid dyes while retaining strength and elongation properties of the degree sufficient for clothing and industrial use, and have arrived at the present invention.

The invention provides a process for production of modified polyesters having very high affinity for acid dyes, which comprises mixing in molten state linear polyesters such as polyalkylene terephthalate with a small amount of an amino-containing polyamide having stable chemical structure uniformly miscible with the polymer without substantial decomposition and, if desired, further subjecting the mixture to heating under a reduced pressure.

The "amino-containing polyamides having stable chemical structures as mixed with linear polyesters such as polyalkylene terephthalate" of this invention is meant to include: (1) the homopolyamides obtained from m-xylylenediamine as the diamine component and an aliphatic tertiary amino dicarboxylic acid wherein the basic amino group is separated from either of the carboxyl groups by at least three carbon atoms as the dicarboxylic acid component; (2) the copolyamides obtained from, as the diamine component, diamine mixtures of which at least 60% is m-xylylenediamine, and as the dicarboxylic acid component one or more of aliphatic tertiary aminodicarboxylic acids, of which up to 60% may be substituted by one or more of aliphatic or aromatic dicarboxylic acids such as adipic, pimelic, azelaic, sebacic, terephthalic, and isophthalic acids.

Examples of the aliphatic tertiary aminodicarboxylic acids are as follows:

N-methyl-2,5-bis(2-carboxyethyl)pyrrolidine
N-ethyl-2,5-bis(2-carboxyethyl)pyrrolidine
N-n-propyl-2,5-bis(2-carboxyethyl)pyrrolidine
N-n-butyl-2,5-bis(2-carboxyethyl)pyrrolidine
N-benzyl-2,5-bis(carboxyethyl)pyrrolidine
N-methyl-2-(2-carboxyethyl)-5-(4-carboxybutyl) pyrrolidine
N-ethyl-2-(2-carboxyethyl)-5-(4-carboxybutyl) pyrrolidine
N-n-propyl-2-(2-carboxyethyl)-5-(4-carboxybutyl) pyrrolidine
N-n-butyl-2-(2-carboxyethyl)-5-(4-carboxybutyl) pyrrolidine
N-benzyl-2-(2-carboxyethyl)-5-(4-carboxybutyl) pyrrolidine
N-methyl-2,6-bis(2-carboxyethyl)hexahydropyridine
N-ethyl-2,6-bis(2-carboxyethyl)hexahydropyridine
N-n-propyl-2,6-bis(2-carboxyethyl)hexahydropyridine
N-n-butyl-2,6-bis(2-carboxyethyl)hexahydropyridine
N-benzyl-2,6-bis(carboxyethyl)hexahydropyridine
Methyl-bis(3-carboxypropyl)amine
Ethyl-bis(3-carboxypropyl)amine
n-Propyl-bis(3-carboxypropyl)amine
n-Butyl-bis(3-carboxypropyl)amine
Benzyl-bis(3-carboxypropyl)amine
5-dimethylamino-hexahydro-isophthalic acid
5-diethylamino-hexahydro-isophthalic acid
5-(1-pyrrolidino)-hexahydro-isophthalic acid
5-(1-piperidino)-hexahydro-isophthalic acid Generally, production of polyesters, particularly polyalkylene terephthalate, consists of the step of reacting terephthalic acid or its functional derivatives with an alkylene glycol or its functional derivatives to first produce an intermediate product of comparatively low molecular weight, and the step of further reacting the same under reduced pressure or in an inert atmosphere to produce high molecular weight polymer having fiber- or film-forming ability. These reactions may be carried out either continuously or batchwise. Further, by replacing a part of the terephthalic acid by other dicarboxylic acids or hydroxy acids, and a part of the alkylene glycol, by other dihydric alcohols, it is possible to produce random or block copolyalkylene terephthalate in the same manner as above.

The polyamides employed in the invention are required to have such a property as is mutually uniformly soluble in molten state in the homo- and co-polyalkylene terephthalates (hereinafter shall be referred to as base polyesters), and shows no substantial decomposition under the severe conditions of melting and mixing with molten base polyesters. The above-mentioned amino-containing polyamides well satisfy the said two requirements.

We found that polyamides other than those specified in this invention, e.g., polyamides obtained from an aliphatic tertiary aminodicarboxylic acid and hexamethylenediamine or decamethylenediamine, do not mix with base polyesters homogeneously, though they are stable under the conditions of mixing with molten base polyesters. Whereas, almost all of the polyamides from aminodicarboxylic acids other than those specified in this invention such as $\alpha$- and $\beta$-aminodicarboxylic acids such as methyliminodiacetic acid and β,β'-n-butyliminodicarboxylic acid and various diamines decompose under the conditions of mixing with molten base polyesters.

That is, the thermal stability and miscibility with the base polyesters of the amino-containing polyamides are realized only when their dicarboxylic acid component consists mainly of one or more of aliphatic tertiary aminodicarboxylic acids, and their diamine component consists mainly of m-xylylenediamine. In such amino-containing polyamides, not more than 60% of the dicarboxylic acid component may be replaced by other dibasic acids such as adipic, pimelic, azealic, sebacic, terephthalic, and isophthalic acids, so far as not less than 60% of the diamine component is m-xylylenediamine, without any deleterious effect on the polyamides' miscibility with the base polyesters and their thermal stability.

The amino-containing polyamides can be easily obtained as high molecular weight polymers by various methods of polymerization, and therefore by merely blending them with high molecular weight base polyesters in molten state, modified polyesters having strength and elongation properties suitable for use as textiles and industrial materials can be produced.

Thus the amino-containing polyamides may be added to and mixed with the base polyesters at the optional stage from after the completion of the polymerization reaction of the base polyesters until before the spinning or film-forming operations, preferably either immediately after the polymerization reaction or immediately before spinning. The amino-containing polyamide having at its termini an amino group or groups, a carboxyl group or groups, or derivatives thereof, it may be the case that, when mixed, the amino-containing polyamide and the base polyester together form a block-copolymerized, modified polyester.

However, it is uncertain whether the amino-containing polyamide, when added to the base polyester, reacts with the latter to be incorporated therewith, or greater part of the polyamide remains unreacted with the base polyester and is present merely in the mixed form with the latter. At any rate, by the mere mixing of the base polyester with the amino-containing polyamide in molten state, the lowering of the softening point of the resultant polymer as compared with that of the base polyester is very small, and therefore a modified polyester of excellent thermal stability can be obtained. In the modified polyester so obtained, presumably a very minor portion of the amino-containing polyamide is present as block-copolymerized therewith. Again, when the base polyester mixed with the amino-containing polyamide in molten state is further heated under a reduced pressure, the resultant modified polyester possesses somewhat lower softening point than that of the base polyester, however exhibits an increased physical strength properties over those of the product obtained by mere mixing of the two in molten state. It is presumed that by the additional heating step, the block copolymerization of the base polyester with the amino-containing polyamide is further promoted.

Because the modified polyester according to the invention contains amide group which is one of the most hydrophilic functional groups, its dye rate with acid dyes is very much accelerated, and therefore it can be dyed simultaneously with wool in a same dye bath. Another advantage of the presence of the amide group resides in that it enables the modified polyesters of the present invention to be dyed to exactly the same color tone as of wool in dyeing with various acid dyes. In contrast, amine-modified polyalkylene terephthalate containing no amide group cannot always be dyed to the same color tone as of wool with various acid dyes. We proposed in the past a process for stably copolymerizing aliphatic aminoglycols or aminodicarboxylic acids with polyalkylene terephthalate, but such modified polyesters containing aminoglycols or aminodicarboxylic acids are always dyed orange red with Solar Red under any dyeing conditions, while wool and the modified polyesters of the invention are both dyed scarlet with the same dye.

Further, the modified polyesters of this invention can be dyed effectively not only with acid dyes but also with a variety of commercial anionic dyes, e.g., chelate dyes such as Cibaran Brilliant Blue-GL and Neolan Pink-BA and chrome dyes of various types, to the dyed effect as of wool, that is, the same coloration and same deepness.

The amount of the amino-containing polyamide to be mixed into the base polyester according to the invention is such that the aliphatic tertiary aminodicarboxylic acid in the polyamide should be 0.5 to 20 mol percent, preferably 2 to 15 mol percent, to the dicarboxylic acid component in the base polyester. Mixing of amino-containing polyamide in an amount as will make the mol percent of the aliphatic tertiary aminodicarboxylic acid less than 0.5 does not achieve the satisfactory improvement in dyeability. Whereas, when the amount of the polyamide added makes the mol percent more than 20, the physical properties of the modified polyester such as thermal stability and melt viscosity are undesirably affected while no substantial improvement in dyeability is achieved. Therefore, the addition within the above-stated range is preferred.

The modified polyesters produced in accordance with the invention are particularly useful as materials for shaped articles prepared by extrusion, slip casting, etc., and may be shaped into yarn, fabric, film, bristle, other machine parts, tubes, reinforcements, accessories, insulator parts, etc.

Further as aforesaid, it is expected that the modified polyesters produced in accordance with the invention are most valuable when made into fibers by melt-spinning. Conventional additives for fiber-forming polyesters such as titanium oxide may be added thereto, or a substance miscible with the modified polyethylene terephthalate such as an organic acid ester may be dissolved therein.

The fibers obtained from the modified polyesters of the invention can be used as textiles woven or knit in the usual manner, as well as non-woven product such as felt. The physical properties of these products are much the same as of the products from the base polyesters such as that obtained from terephthalic acid and glycol. Furthermore, the same can be dyed to deep colors with acid dyes such as Alizarine Light Blue-AA, Rocceline-NS and Solarset Orange, as well as anionic dyes such as Metallic and chelate dyes like Cibaran Brilliant Blue-GL, Neolan Pink-BA etc. Again with a suitable control in the addition amount of the amino-containing polyamide, mixed-spun yarn composed of the modified polyester and wool can be uniformly dyed in a same dye bath. The fibers and films obtained from the modified polyesters of this invention possess high affinity also for dispersion dyes, which all the more enhances the utility of such fibers and films.

The invention shall now be explained as to examples which follow, it being understood that they are in no way intended for limiting the scope of the subject invention except as set forth in the appended claims.

In the examples, parts are by weight, and [η] stands for the intrinsic viscosity of the o-chlorophenol solution of the polyester at 35° C.

*Reference Example 1.*—This reference example shows the process for producing homopolyamide consisting of N-n-butyl pyrrolidine-2,5-dipropionic acid/m-xylylenediamine (100/100 mol percent).

After refluxing for 2 hours a mixture of 32.7 parts of N-n-butyl-pyrrolidine-2,5-bis(propionic acid ethyl ester), 14.3 parts of m-xylylenediamine, and 20 parts of dried toluene, toluene-ethanol mixture was distilled off from the reaction mixture below 240° C., and the obtained residue was stirred at 240° C. for 2 hours in an inert gas stream under atmospheric pressure, and then it was stirred for 8 hours at 270° C. under a pressure below 0.5 mm. Hg. A light yellow solid homopolyamide was obtained.

Its melting point ranged 83–87° C., and [η] was 0.21.

*Reference Example 2.*—This reference example shows the process for producing the homopolyamide consisting of N-ethyl-2-(2-carboxyethyl)-5-(4-carboxybulyt)-pyrrolidine/m-xylylenediamine (100/100 mol percent) used in this invention.

A mixture of 32.7 parts of N-ethyl-2-(2-ethoxycarbonylethyl) - 5-(4-ethoxycarbonylbutyl)pyrrolidine, 14.3 parts of m-xylylenediamine, and 20 parts of dried toluene was heated under reflux for 2 hours. Then the toluene-ethanol mixture was distilled off from the reaction mixture below 240° C., the resultant residue was stirred for 2 hours at 240° C. in an inert gas stream under atmospheric pressure, and then heated with stirring for 8 hours at 270° C. under a pressure less than 0.5 mm. Hg. An amorphous light yellow solid homopolyamide was obtained, which had an [η] of 0.22.

*Reference Example 3.*—This reference example illustrates the process for producing the homopolyamide prepared from benzyl - bis(3-carboxypropyl)amine/m-xylylenediamine (100/100 mol percent) used in the process of this invention.

A mixture of 30.9 parts of benzyl-bis(3-methoxy carbonylpropyl)amine, 14.3 parts of m-xylylenediamine, and 20 parts of dried toluene was heated under reflux for 2 hours. At below 240° C., toluene-methanol mixture was distilled off from the reaction mixture, and the resultant residue was heated with stirring first for 2 hours at 240° C. in an inert gas stream under atmospheric pressure, and then for 8 hours at 270° C. under a pressure less than 0.5 mm. Hg. Thus an amorphous, light yellow solid homopolyamide having an [η] of 0.22 was obtained.

*Reference Example 4.*—This reference example illustrates the process for the production of copolyamide consisting of N-n-butylpyrrolidine-2,5-dipropionic acid:adipic acid/m-xylylenediamine (50:50/100 mol percent) used in the present invention.

A mixture of 65.4 parts of N-n-butyl-pyrrolidine-2,5-bis(propionic acid ethyl ester), 40.4 parts of diethyl adipate, 55.7 parts of m-xylylenediamine, and 60 parts of dried toluene was heated under reflux for 2 hours and the toluene-ethanol mixture formed was distilled off from the reaction mixture below 240° C. Thus obtained residue was stirred in an inert gas stream at 240° C. under atmospheric pressure for 2 hours, and then stirred at 270° C. under a pressure below 0.5 mm. Hg for 8 hours. A light yellow solid copolyamide was obtained. Its melting point ranged 119–122° C. and [η] was 0.30.

*Reference Example 5.*—This reference example shows the process for producing copolyamide consisting of 5-diethylamino-hexahydro-isophthalic acid:sebacic acid/m-xylylenediamine (50:50/100 mol percent) used in the present invention.

A mixture of 27.1 parts of dimethyl 5-diethylamino-hexahydro-isophthalate, 23.0 parts of dimethyl sebacate, 28.6 parts of m-xylylenediamine and 40 parts of dried toluene was heated under reflux for 8 hours, and from the resultant reaction mixture, toluene-methanol mixture was distilled off at below 240° C. The residue was heated with stirring first for 2 hours at 240° C. in an inert gas stream under atmospheric pressure, and then for 8 hours at 270° C. under a pressure less than 0.5 mm. Hg. Thus an amorphous, light yellow solid copolyamide having an [η] of 0.28 was obtained.

*Reference Example 6.*—This reference example illustrates the process for producing copolyamide consisting of N - n - butylpyrrolidine - 2,5-dipropionic acid/m-xylylenediamine:hexamethylenediamine (100/80:20 mol percent) used in the invention.

A mixture of 32.7 parts of diethyl N-n-butylpyrrolidine-2,5-dipropionate, 11.4 parts of m-xylylenediamine, 2.4 parts of hexamethylenediamine, and 20 parts of dried toluene was heated under reflux for 2 hours, then from the reaction mixture, toluene-ethanol mixture was distilled off at below 240° C. The resultant residue was heated with stirring first for 2 hours at 240° C. in an inert gas stream under atmospheric pressure, and then for 8 hours at 270° C. under a pressure less than 0.5 mm. Hg. Thus a light yellow, solid copolyamide having a melting point of 71–76° C., and an [η] of 0.23 was obtained.

*Reference Example 7.*—This reference example illustrates the process for producing copolyamide consisting of N-ethylhexahydropyridine-2,6-dipropionic acid:adipic acid/m-xylylenediamine:hexamethylenediamine (80:20/80:20 mol percent) used in the process of the present invention.

A mixture of 22.8 parts of dimethyl N-ethylhexahydropyridine-2,6-diproprionate, 3.5 parts of dimethyl adipate, 11.4 parts of m-xylylenediamine, 2.4 parts of hexamethylenediamine and 20 parts of dried toluene was heated under reflux for 2 hours, and then from the reaction mixture toluene-methanol mixture was distilled off at below 240° C. The resultant residue was heated with stirring first for 2 hours at 240° C. in an inert gas stream, and then for 8 hours at 270° C. under a pressure less than 0.5 mm. Hg. Thus an amorphous, light yellow solid copolyamide having an [η] of 0.23 was obtained.

*Reference Example 8.*—This reference example illustrates the process for producing copolyamide consisting of N - n - butylpyrrolidine - 2,5-dipropionic acid:isophthalic acid/m - xylylenediamine:decamethylenediamine (50:50/70:30 mol percent) used in the process of the present invention.

A mixture of 16.4 parts of N-n-butylpyrrolidine-2,5-bis(propionic acid diethyl ester), 11.1 parts of diethyl isophthalate, 10.0 parts of m-xylylenediamine, 5.4 parts of decamethylenediamine, and 20 parts of dried toluene, was heated under reflux for 2 hours, and after the toluene-ethanol mixture was distilled off from the reaction mixture at below 240° C., the resultant residue was heated with stirring first for 2 hours at 240° C. in an inert gas stream under atmospheric pressure, and then for 8 hours at 270° C. under a pressure less than 0.5 mm. Hg. Thus an amorphous, light yellow solid copolyamide having an [η] of 0.24 was obtained.

*Reference Example 9.*—This reference example illustrates the process for producing copolyamide consisting of N-n-butylpyrrolidine-2,5-dipropionic acid/m-xylylenediamine:hexamethylenediamine (100/50:50 mol percent).

A mixture of 65.4 parts of N-n-butyl-pyrrolidine-2,5-bis(propionic acid diethyl ester), 13.9 parts of m-xylylenediamine, 12.1 parts of hexamethylenediamine and 30 parts of dried toluene was heated under reflux for 2 hours, and after distilling off the toluene-methanol mixture from the reaction mixture at the temperature below 240° C., the residue was stirred at 240° C. in an inert gas stream under atmospheric pressure for 2 hours, and then it was stirred at 270° C. under a pressure below 0.5 mm. Hg for 8 hours. A crystalline, light yellow solid copolyamide was obtained.

Its melting point ranged between 111° C. and 116° C., and [η] was 0.36.

*Reference Example 10.*—This reference example illustrates the process for producing copolyamide consisting of n - butyl - bis(3 - carboxypropyl)amine/m-xylylenediamine:decamethylenediamine (100/50:50 mol percent) used in the present invention.

A mixture of 27.5 parts of n-butyl-bis(3-methoxycarbonylpropyl)amine, 7.5 parts of m-xylylenediamine, 9.4 parts of decamethylenediamine, and 20 parts of dried toluene was heated under reflux for 2 hours. Then the toluene-methanol mixture was distilled off from the reaction mixture, and the resultant residue was heated under stirring first for 2 hours at 240° C. in an inert gas stream under atmospheric pressure, and then for 8 hours at 270° C. under a pressure less than 0.5 mm. Hg. Thus an amorphous, light yellow solid copolyamide having an [η] of 0.30 was obtained.

*Example 1.*—A mixture composed of 97 parts of dimethyl terephthalate, 69 parts of ethylene glycol and 0.02 part of titanium tetraethoxide was heated for 3 hours at 160–220° C., and the formed methanol was distilled off. The reaction mixture was maintained at 275° C. and polymerized first for an hour under a pressure of 760–10 mm. Hg and then for 1.5 hours under a pressure of 10–0.5 mm. Hg. To the resultant polymer, 18.5 parts of the homopolyamide obtained in Reference Example 1 were added while the former was maintained at 275° C., and the mixture was stirred for 40 minutes to yield a transparent, light yellow polymer having a softening point of 259.3° C., and an $[\eta]$ of 0.53.

After dried in hot air of 140° C. for 5 hours, the polymer was spun at 275° C. at the spinning rate of 700 m./min. Immediately after the spinning operation was started the polymer had an $[\eta]$ of 0.52, and at the end of the operation, an $[\eta]$ of 0.50. When drawn by 4.3 times at 70° C., the fiber had a denier of 3.2, a tenacity of 4.5 g./de. and a breaking elongation of 38%.

0.1 part of thus made fiber was dyed in a bath containing 0.5 part of Alizaline Light Blue-AA, 3 parts of glacial acetic acid, 15 parts of Glauber's salt, and 82 parts of water at 100° C. for an hour, and then it was rinsed in a 0.2% synthetic detergent solution for 20 minutes at 70° C. and then washed with water at the same temperature. The fiber was dyed to deep blue.

*Example 2.*—A mixture of 97 parts of dimethyl terephthalate, 69 parts of ethylene glycol and 0.02 part of titanium tetraethoxide was heated at 160–220° C. for 3 hours, and the methanol formed and distilled off. The reaction mixture was maintained at 275° C. and polymerized under a pressure of 760–10 mm. Hg for 1 hour and then under a pressure of 10–0.5 mm. Hg for 1.5 hours. The obtained polymer was kept at 285° C., and 31 parts of the copolyamide obtained in Reference Example 4 were added thereto. The mixture was stirred under the pressure below 0.5 mm. Hg for 40 minutes to yield a transparent, light yellow polymer having a softening point of 257.9° C. and an $[\eta]$ of 0.60.

The polymer was dried in hot air at 140° C. for 6 hours, spun at 275° C. at the spinning rate of 600 m./min., and then was drawn by 4.5 times at 80° C. The resultant fiber had a denier of 2.8, a tenacity of 4.1 g./de., and a breaking elongation of 46%.

0.1 part of this fiber and 0.1 part of wool were together dyed in a bath containing 0.5 part of Cibaran Brilliant Blue-GL, 3 parts of glacial acetic acid, 15 parts of Glauber's salt and 82 parts of water, at 100° C. for an hour, and then rinsed in the same manner as in Example 1. The both fibers were similarly dyed to deep blue.

*Example 3.*—After a mixture of 97 parts of dimethyl terephthalate, 8.7 parts of dimethyl adipate, 77 parts of ethylene glycol and 0.022 part of titanium tetraethoxide was heated at 150–230° C. for 3 hours to remove the methanol formed, the reaction mixture was polymerized at 275° C. under a pressure of 760–10 mm. Hg for an hour and then under a pressure of 10–0.5 mm. Hg for 1.5 hours.

The obtained polymer was kept at 260° C. while 18.5 parts of the homopolyamide obtained in Reference Example 1 were added thereto, and stirred under a pressure of 10 mm. Hg for 40 minutes. A transparent, light yellow polymer having a softening point of 239.4° C., and an $[\eta]$ of 0.55 was obtained.

After dried in hot air of 140° C. for 6 hours, the polymer was spun at 260° C. at the spinning rate of 600 m./min. and drawn by 4.5 times at 80° C. The resultant fiber had a denier of 2.9, a tenacity of 4.2 g./de., and a breaking elongation of 48%. When 0.1 part of the fiber was dyed with Cibaran Brilliant Blue-GL as in Example 2, the same was dyed to deep blue.

*Example 4.*—After a mixture of 97 parts of dimethyl terephthalate, 9.7 parts of dimethyl isophthalate, 77 parts of ethylene glycol and 0.022 part of titanium tetraethoxide was heated for 3.5 hours at 160–230° C. to removed the methanol formed, the reaction mixture was polymerized at 275° C. under a pressure of 760–10 mm. Hg for an hour, and then under a pressure of 10–0.5 mm. Hg for 1.5 hours. Thus a polymer having a softening point of 240.3° C. and an $[\eta]$ of 0.88 was obtained.

After dried in hot air at 160° C. for 2 hours, the polymer was added with 18.5 parts of the homopolyamide obtained in Reference Example 1, and mixed with stirring for 40 minutes at 260° C. Then the mixture was spun at the same temperature at the spinning rate of 700 m./min. Immediately after the spinning operation was started the polymer had an $[\eta]$ of 0.53, and at the end of the operation, and $[\eta]$ of 0.51.

When drawn by 3.9 times at 70° C., the fiber had a denier of 3.1, a tenacity of 2.6 g./de., and a breaking elongation of 41%.

0.1 part of this fiber was colored to deep blue with Cibaran Brilliant Blue-GL when dyed in the same manner as in Example 2.

*Example 5.*—A mixture composed of 97 parts of dimethyl terephthalate, 69 parts of ethylene glycol and 0.02 part of titanium tetraethoxide was heated for 3 hours at 160–220° C., and the methanol formed was distilled off. The reaction mixture was then polymerized first for an hour under the pressure of 760–10 mm. Hg, and then for 1.5 hours under a pressure of 10–0.5 mm. Hg, while always maintaining the temperature of 275° C. The resultant base polyester was maintained at 275° C., to which 18.5 parts of the homopolyamide obtained in the Reference Example 1 were added, and the mixture was stirred for 40 minutes under a pressure below 0.5 mm. Hg. A transparent, light yellow polymer having a softening point of 258.1° C., and an $[\eta]$ of 0.57 was obtained.

After dried in hot air at 140° C. for 6 hours, the polymer was spun at 275° C. at the spinning rate of 600 m./min. and drawn by 4.5 times at 80° C. The resultant fiber had a denier of 2.8, a tenacity of 3.8 g./de., and a breaking elongation of 45%. The fiber was dyed to deep blue when dyed and rinsed in the same manner as in Example 1.

*Example 6.*—To a base polyester obtained from a mixture composed of 97 parts of dimethyl terephthalate, 69 parts of ethylene glycol and 0.02 parts of titanium tetraethoxide in the same manner as in Example 1, 19.0 parts of the homopolyamide obtained in Reference Example 2 were added while the former was maintained at 275° C. The mixture was stirred for 40 minutes under a pressure below 0.5 mm. Hg, to yield a transparent, yellow polymer having a softening point of 258.6° C. and an $[\eta]$ of 0.55.

After dried in hot air at 140° C. for 6 hours, the polymer was spun at 275° C. at the spinning rate of 600 m./min., and drawn by 4.5 times at 80° C. The resultant fiber had a denier of 2.7, a tenacity of 3.9 g./de. and a breaking elongation of 42%. This fiber was dyed to deep blue with Alizarine Light Blue-AA when dyed in the same manner as in Example 1.

*Example 7.*—To a base polyester obtained from a mixture composed of 97 parts of dimethyl terephthalate, 69 parts of ethylene glycol, and 0.02 part of titanium tetraethoxide in the same manner as in Example 1, 33 parts of the copolyamide obtained in Reference Example 3 were added while the former was maintained at 275° C. The mixture was stirred under a pressure below 0.5 mm. Hg for 40 minutes to yield a transparent yellow polymer having a softening point of 257° C. and an $[\eta]$ of 0.54.

After dried in hot air at 140° C. for 6 hours, the polymer was spun at 275° C. at the spinning rate of 600 m./min., and drawn by 4.5 times at 80° C. The resultant fiber had a denier of 2.8, a tenacity of 3.5 g./de. and a breaking elongation of 45%. This fiber was dyed to deep blue with Alizarine Light Blue-AA when dyed in the same manner as in Example 1.

*Example 8.*—To a base polyester obtained in the same manner as in Example 1 from a mixture of 97 parts of dimethyl terephthalate, 69 parts of ethylene glycol and 0.02 part of titanium tetraethoxide, 19 parts of the copolyamide obtained in Reference Example 4 was added while the former was maintained at 275° C. The mixture was stirred for 40 minutes under a pressure below 0.5 mm. Hg, to yield a transparent, yellow polymer having a softening point of 259.1° C. and an [η] of 0.56.

After dried in hot air of 140° C. for 6 hours, the polymer was spun at 275° C. at the spinning rate of 600 m./min., and drawn by 4.5 times at 80° C. The resultant fiber had a denier of 2.9, a tenacity of 3.8 g./de. and a breaking elongation of 41%. This fiber was dyed to deep blue when dyed with Alizarine Light Blue-AA and rinsed as in Example 1.

*Example 9.*—To a base polyester obtained as in Example 1 from a mixture composed of 97 parts of dimethyl terephthalate, 69 parts of ethylene glycol, and 0.02 part of titanium tetraethoxide, 21 parts of the copolyamide obtained in Reference Example 5 were added while the former was maintained at 275° C. The mixture was stirred for 40 minutes under a pressure below 0.5 mm. Hg to yield a transparent, yellow polymer having a softening point of 257.4° C. and an [η] of 0.60.

After dried in hot air of 140° C. for 6 hours, the polymer was spun at 275° C. at a spinning rate of 600 m./min. and drawn by 4.5 times at 80° C. The resultant fiber had a denier of 2.6, a tenacity of 3.7 g./de. and a breaking elongation of 46%.

This fiber was dyed to deep blue when dyed with Alizarine Light Blue-AA and rinsed as in Example 1.

*Example 10.*—To a base polyester prepared as in Example 1 from a mixture composed of 97 parts of dimethyl terephthalate, 69 parts of ethylene glycol, and 0.02 part of titanium tetraethoxide, 34 parts of the copolyamide obtained in Reference Example 6 were added while the former was maintained at 275° C. The mixture was stirred for 40 minutes under a pressure below 0.5 mm. Hg to yield a transparent, yellow polymer having a softening point of 259.8° C. and an [η] of 0.59.

After dried in hot air of 140° C. for 6 hours, the polymer was spun at 275° C. at a spinning rate of 600 m./min., and drawn by 4.5 times at 80° C. The resultant fiber had a denier of 2.9, a tenacity of 3.9 g./de. and a breaking elongation of 38%.

This fiber was dyed to dep blue when dyed with Alizarine Light Blue-AA and rinsed as in Example 1.

*Comparison Example 1.*—A mixture of 97 parts of dimethyl terephthalate, 69 parts of ethylene glycol and 0.02 part of titanium tetraethoxide was heated at 160–230° C. for 3 hours to remove the methanol formed. Then the reaction mixture was polymerized at 275° C. under a pressure of 760–10 mm. Hg for an hour and then under a pressure of 10–0.5 mm. Hg for 1.5 hours.

The obtained polymer was kept at 275° C., and 18.1 parts of the copolyamide obtained in Reference Example 9 were added thereto, and stirred under a pressure of 0.5 mm. Hg for 60 minutes. An opaque, light yellow solid resulted.

A semi-transparent film prepared from the opaque polymer was observed with an optical microscope of 200 magnifications. In the polyethylene terephthalate background, dispersion of round copolyamide particles was recognized. Further, the film was drawn by 2.3 times at 80° C., dyed with Cibaran Brilliant Blue-GL and rinsed in the same manner as in Example 2, and again examined under the microscope. It was observed that the polyethylene terephthalate background remained entirely undyed, but only the dispersed copolyamide particles stretched into oval-shape due to the drawing treatment were dyed to blue.

*Comparative Example 2.*—A mixture composed of 97 parts of dimethyl terephthalate, 69 parts of ethylene glycol, and 0.02 part of titanium tetraethoxide was reacted for 3.5 hours at 160–210° C., and the methanol formed was distilled off. Then the reaction mixture was polymerized for an hour under a pressure of 760–10 mm. Hg, and further for 1.5 hours under a pressure of 10–0.5 mm. Hg, while maintaining the temperature at 275° C.

The resultant polymer was melted, and while the molten mass still retained the temperature of 275° C., 19 parts of the copolyamide obtained in Reference Example 7 were added thereto. The mixture was stirred for 70 minutes under a pressure of 0.5 mm. Hg to yield an opaque, light yellow solid polymer.

A film prepared from the polymer was semi-transparent, and when observed with an optical microscope of 200 magnifications, it was recognized that in the polyethylene terephthalate background, round particles of the copolyamide were dispersed. Further, the film was drawn by 2.5 times at 80° C., dyed with Cibaran Brilliant Blue-GL and rinsed in the same manner as in Example 2, and again examined under the microscope. It was observed that the polyethylene terephthalate background remained entirely undyed, but only the dispersed copolyamide particles stretched into oval-shape due to the drawing treatment were dyed to blue.

We claim:

1. A process for producing modified polyesters which comprises mixing in molten state a linear polyester with at least one polyamide, the dicarboxylic acid component of said polyester being mainly composed of terephthalic acid, the glycol component of said polyester being mainly composed of an alkylene glycol, the diamine component of the polyamide being mainly composed of m-xylylenediamine and the dicarboxylic acid component of the polyamide being mainly composed of at least one aliphatic tertiary aminodicarboxylic acid in which the basic amino group is separated from either of the carboxyl groups by at least three carbon atoms.

2. A process for producing modified polyesters which comprises mixing in molten state a linear polyester with at least one polyamide and then heating the mixture under a reduced pressure, the dicarboxylic acid component of said polyester being mainly composed of terephthalic acid, the glycol component of said polyester being mainly composed of alkylene glycol, the diamine component of the polyamide being mainly composed of m-xylylenediamine and the dicarboxylic acid component of the polyamide being mainly composed of at least one aliphatic tertiary aminodicarboxylic acid in which the basic amino group is separated from either of the carboxyl groups by at least three carbon atoms.

3. The process of claim 1 wherein at least 60 mol percent of the diamine component of the polyamide is m-xylylenediamine.

4. The process of claim 2 wherein at least 60 mol percent of the diamine component of the polyamide is m-xylylenediamine.

5. The process of claim 1 wherein at least 40 mol percent of the dicarboxylic acid component of the polyamide is one or more of aliphatic tertiary amino-dicarboxylic acids in which the basic amino group is separated from either of the carboxyl groups by at least three carbon atoms.

6. The process of claim 2 wherein at least 40 mol percent of the dicarboxylic acid component of the polyamide is one or more of aliphatic tertiary aminodicarboxylic acids in which the basic amino group is separated from either of the carboxyl groups by at least three carbon atoms.

7. The process of claim 1 wherein the polyamide and the linear polyester are mixed in molten state at such a ratio that the amount of the aliphatic tertiary aminodicarboxylic acid in the polyamide becomes 0.5–20 mol percent to the dicarboxylic acid component of said polyester.

8. The process of claim 2 wherein the polyamide and the linear polyester are mixed in molten state at such a ratio that the amount of the aliphatic tertiary aminodicarboxylic acid in the polyamide becomes 0.5–20 mol percent to the dicarboxylic acid component of said polyester.

References Cited by the Examiner

UNITED STATES PATENTS

| | | | |
|---|---|---|---|
| 2,868,795 | 1/1959 | Cislak | 260—78 |
| 3,065,207 | 11/1962 | Andres | 260—78 |
| 3,147,267 | 9/1964 | Rogers | 260—78 |
| 3,161,608 | 12/1964 | Caldwell et al. | 260—857 |

FOREIGN PATENTS 2,765,294  10/1956  England.

MURRAY TILLMAN, *Primary Examiner.*

J. T. GOOLKASIAN, *Assistant Examiner.*